(12) United States Patent
Li et al.

(10) Patent No.: US 12,266,267 B2
(45) Date of Patent: Apr. 1, 2025

(54) METHOD AND APPARATUS FOR ACHIEVING VEHICLE-ROAD COORDINATION AT INTERSECTION WITHOUT SIGNAL LIGHTS

(71) Applicant: Beijing Jingdong Qianshi Technology Co., Ltd., Beijing (CN)

(72) Inventors: Bai Li, Beijing (CN); Xuepeng Bian, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 224 days.

(21) Appl. No.: 17/916,383

(22) PCT Filed: Mar. 25, 2021

(86) PCT No.: PCT/CN2021/082858
§ 371 (c)(1),
(2) Date: Sep. 30, 2022

(87) PCT Pub. No.: WO2021/197177
PCT Pub. Date: Oct. 7, 2021

(65) Prior Publication Data
US 2023/0154330 A1 May 18, 2023

(30) Foreign Application Priority Data
Apr. 1, 2020 (CN) .......................... 202010248522.9

(51) Int. Cl.
G08G 1/16 (2006.01)
G08G 1/0967 (2006.01)

(52) U.S. Cl.
CPC ....... *G08G 1/164* (2013.01); *G08G 1/096725* (2013.01); *G08G 1/166* (2013.01)

(58) Field of Classification Search
CPC .. G08G 1/0112; G08G 1/0116; G08G 1/0133; G08G 1/0145; G08G 1/096725;
(Continued)

(56) References Cited

U.S. PATENT DOCUMENTS 10,288,439 B2  5/2019  Pedersen
11,315,425 B2  4/2022  Takaaki
(Continued)

FOREIGN PATENT DOCUMENTS

CN  108871370 A  11/2018
CN  109855639 A   6/2019
(Continued)

OTHER PUBLICATIONS

International Search Report for PCT/CN2021/082858, dated Jun. 23, 2021, 5 pages.
(Continued)

*Primary Examiner* — Richard A Goldman
*Assistant Examiner* — Aarron E Santos
(74) *Attorney, Agent, or Firm* — BLANK ROME LLP

(57) ABSTRACT

A method and apparatus for achieving vehicle-road coordination at an intersection without signal lights, the method comprising: acquiring information used for trajectory planning, and inputting the information used for trajectory planning into a model for planning a vehicle driving trajectory to obtain planned trajectory information, wherein the model used for planning the vehicle driving trajectory determines constraint conditions for avoiding collisions on the basis of road region width information in a plane coordinate system, the coordinates of obstacles, and the coordinates and traffic action types of each vehicle, and determines a loss function on the basis of motion state parameters of each vehicle and the coordinates of each
(Continued)

vehicle; and on the basis of the planned trajectory information, driving each vehicle to drive.

18 Claims, 6 Drawing Sheets

(58) Field of Classification Search
CPC ....... G08G 1/096741; G08G 1/096775; G08G 1/164; G08G 1/166; G08G 1/096833; G08G 1/096888
See application file for complete search history.

(56) References Cited

U.S. PATENT DOCUMENTS

| | | | |
|---|---|---|---|
| 2019/0079717 A1* | 3/2019 | Lee | B60K 35/10 |
| 2019/0236948 A1* | 8/2019 | Wang | G08G 1/096725 |
| 2019/0318620 A1 | 10/2019 | Yang et al. | |
| 2020/0116994 A1 | 1/2020 | Huang | |
| 2020/0242922 A1* | 7/2020 | Dulberg | G08G 1/166 |

FOREIGN PATENT DOCUMENTS

| | | |
|---|---|---|
| CN | 109920246 A | 6/2019 |
| CN | 110884502 A | 3/2020 |
| CN | 111785062 A | 10/2020 |
| DE | 10-2017122969 A1 | 4/2015 |
| JP | 2019185772 A | 10/2019 |
| WO | 2018215833 A1 | 11/2018 |
| WO | WO-2019/163268 A | 8/2019 |

OTHER PUBLICATIONS

B. Li, "Computational Optimal Controls Methods for Automated Vehicle Motion Planning Problems with Complicated Constraints" Chinese Doctoral Dissertations, Aug. 15, 2018, 73 pages, pp. 33-44.

* cited by examiner

METHOD AND APPARATUS FOR ACHIEVING VEHICLE-ROAD COORDINATION AT INTERSECTION WITHOUT SIGNAL LIGHTS

CROSS-REFERENCE TO RELATED APPLICATIONS

This patent application is a National Stage of International Application No. PCT/CN2021/082858, filed Mar. 25, 2021, which claims the priority of Chinese Patent Application No. 202010248522.9, filed on Apr. 1, 2020, and entitled "Method and Apparatus for Achieving Vehicle-road Coordination at Intersection Without Signal Lights", the entire content of which is herein incorporated by reference.

TECHNICAL FIELD

Embodiments of the present disclosure relate to the technical field of intelligent traffic management, in particular to the technical field of vehicle-road coordination management, and more particularly, to a method and apparatus for achieving vehicle-road coordination at an intersection without signal lights.

BACKGROUND

Vehicle-road coordination, using technologies such as wireless communication and the new generation of Internet, implements dynamic real-time information interaction between vehicles, vehicles and roads in an all-round way, and on the basis of the collection and fusion of full-time dynamic traffic information, carries out vehicle active safety control and road coordination management, which fully implements effective coordination of people, vehicles and roads, ensures traffic safety and improves traffic efficiency, thereby forming a safe, efficient and environmentally friendly road traffic system.

SUMMARY

Embodiments of the present disclosure propose a method and apparatus for achieving vehicle-road coordination at an intersection without signal lights.

In a first aspect, an embodiment of the present disclosure provides a method for achieving vehicle-road coordination at an intersection without signal lights, the method including: acquiring road region width information, coordinates of obstacles and coordinates of each vehicle in a plane coordinate system, acquiring a traffic action type of each vehicle, and acquiring motion state parameters of each vehicle; inputting the road region width information, the coordinates of the obstacles and the coordinates of each vehicle in the plane coordinate system, the traffic action type of each vehicle and the motion state parameters of each vehicle into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and driving each vehicle to travel, on the basis of the planned trajectory information.

In some embodiments, the traffic action type of each vehicle includes: one of turning-left action, going straight action, or turning-right action required for each vehicle to travel into any target lane.

In some embodiments, acquiring coordinates of obstacles in a plane coordinate system, includes: mapping the obstacles to the plane coordinate system in a form of a square, based on size information of the obstacles and position information of the obstacles on a road; and replacing the square with a plurality of inscribed circles of the square, where each inscribed circle is tangent to two sides of the square adjacent to an inner corner of the square near an origin of the plane coordinate system.

In some embodiments, acquiring coordinates of each vehicle in a plane coordinate system, includes: mapping each vehicle to the plane coordinate system in a form of a rectangle, based on size information of each vehicle and position information of the vehicle on a road; and replacing the rectangle with symmetrical double circumscribed circles of the rectangle, to obtain coordinates of centers and a radius of the symmetrical double circumscribed circles of the rectangle in the plane coordinate system, where the symmetrical double circumscribed circles are the smallest symmetrical double circumscribed circles capable of containing the rectangle.

In some embodiments, replacing the square with a plurality of inscribed circles of the square to obtain coordinates of centers and a radius of the symmetrical double circumscribed circles of the rectangle in the plane coordinate system, includes: taking a circle, that uses a side length of the square as a diameter and a center of the square as a center, as a largest inscribed circle of the square; and using the plurality of circles in the square that are tangent to the two sides of the square adjacent to the inner corner of the square near the origin of the plane coordinate system as a plurality of small inscribed circles of the square, where radii of the plurality of small inscribed circles and a radius of the largest inscribed circle constitute a proportional decay sequence.

In some embodiments, determining constraint conditions for avoiding collisions on the basis of the road region width information, the coordinates of the obstacles, and the coordinates of each vehicle in the plane coordinate system and the traffic action type, includes: determining a first collision avoiding constraint condition that each vehicle does not collide with the obstacles at any time t in any traffic action type based on the road region width information, the coordinates of the obstacles and the coordinates of each vehicle; determining, based on the first collision avoiding constraint condition and the road region width information, a passable region for each vehicle in any traffic action type; and determining, based on the coordinates of each vehicle, a second collision avoiding constraint condition in the passable region that any two vehicles in a same traffic action type do not collide and any two vehicles in different traffic action types do not collide.

In some embodiments, determining, based on the first collision avoiding constraint condition and the road region width information, a passable region for each vehicle in any traffic action type, includes: determining, based on the first collision avoiding constraint condition and the road region width information, in response to the traffic action type of the vehicle being a turning-left action, that the passable region for the vehicle in the turning-left action includes an opposite road region; and/or using, based on the first collision avoiding constraint condition and the road region width information, an intersection region in a road region in the plane coordinate system as the passable region for each vehicle to travel freely and flexibly.

In some embodiments, determining a loss function on the basis of the motion state parameters of each vehicle and the coordinates of each vehicle, includes: determining, based on the motion state parameters of each vehicle, a first equation for a change of the motion state parameters of each vehicle; determining, based on the coordinates of each vehicle, a second equation for a distance between any two vehicles; determining, based on the coordinates of each vehicle, a third equation for distances from each vehicle to an X-axis and a Y-axis of the plane coordinate system; and determining the loss function, based on the first equation, the second equation and the third equation.

In some embodiments, the method for achieving vehicle-road coordination at an intersection without signal lights is applied to a vehicle-road coordination management system, and the vehicle-road coordination management system is configured to: acquire coordinates, a traffic action type and motion state parameters of each intelligent networked vehicle within a preset distance from the intersection using a sensing device and a communication device; and perform, based on the acquired coordinates, the traffic action type and the motion state parameters of each intelligent networked vehicle, the method for achieving vehicle-road coordination at an intersection without signal lights according to any one of claims 1 to 8, until the vehicle travels the preset distance out of the intersection.

In a second aspect, an embodiment of the present disclosure provides a method for achieving vehicle-road coordination at an intersection without signal lights, including: acquiring information used for trajectory planning, including: acquiring road region width information, coordinates of obstacles and coordinates of each vehicle in a plane coordinate system, acquiring a traffic action type of each vehicle, and acquiring motion state parameters of each vehicle; where, the acquiring coordinates of obstacles in a plane coordinate system includes: using a center point of a crossing in the plane coordinate system as a coordinate origin, acquiring coordinates of four blocks adjacent to the crossing; each block including: a largest circle, a plurality of small circles that are inscribed with two sides of a circumscribed square of the largest circle adjacent to the origin, where sides of the circumscribed square of the largest circle are parallel to coordinate axes of the plane coordinate system, and radii of the plurality of small circles and a radius of the largest circle constitute a proportional decay sequence; inputting the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and driving each vehicle to travel, on the basis of the planned trajectory information.

In a third aspect, an embodiment of the present disclosure provides an apparatus for achieving vehicle-road coordination at an intersection without signal lights, including: an acquisition unit, configured to acquire road region width information, coordinates of obstacles and coordinates of each vehicle in a plane coordinate system, acquire a traffic action type of each vehicle, and acquire motion state parameters of each vehicle; a planning unit, configured to input the road region width information, the coordinates of the obstacles and the coordinates of each vehicle in the plane coordinate system, the traffic action type of each vehicle, and the motion state parameters of each vehicle into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and a driving unit, configured to drive each vehicle to travel, on the basis of the planned trajectory information.

In some embodiments, in the acquisition unit and the planning unit, the traffic action type of each vehicle includes: one of turning-left, going straight, or turning-right actions required for each vehicle to travel into any target lane.

In some embodiments, in the acquisition unit, the acquire coordinates of obstacles in a plane coordinate system includes: map the obstacles to the plane coordinate system in a form of a square, based on size information of the obstacles and position information of the obstacles on a road, and replace the square with a plurality of inscribed circles of the square, where each inscribed circle is tangent to two sides of the square adjacent to an inner corner of the square near an origin of the plane coordinate system.

In some embodiments, in the acquisition unit, the acquire coordinates of each vehicle in a plane coordinate system includes: map each vehicle to the plane coordinate system in a form of a rectangle, based on size information of each vehicle and position information of the obstacles on a road, and replace the rectangle with symmetrical double circumscribed circles of the rectangle, to obtain coordinates of centers and a radius of the symmetrical double circumscribed circles of the rectangle in the plane coordinate system, where the symmetrical double circumscribed circles are the smallest symmetrical double circumscribed circles that can contain the rectangle.

In some embodiments, in the acquisition unit, the replace the square with a plurality of inscribed circles includes: take a circle, that uses a side length of the square as a diameter and a center of the square as a center, as the largest inscribed circle of the square; and use the plurality of circles of the square that are tangent to the two sides of the square adjacent to the inner corner of the square near the origin of the plane coordinate system as a plurality of small inscribed circles of the square, where radii of the plurality of small inscribed circles and a radius of the largest inscribed circle constitute a proportional decay sequence.

In some embodiments, in the planning unit, the determines constraint conditions for avoiding collisions on the basis of the road region width information, the coordinates of the obstacles, and the coordinates of each vehicle in the plane coordinate system and the traffic action type is determined by the following subunits: a first collision avoiding constraint condition determining subunit, configured to determine a first collision avoiding constraint condition that each vehicle does not collide with the obstacles at any time t in any traffic action type based on the road region width information, the coordinates of the obstacles and the coordinates of each vehicle; a passable region determining subunit, configured to determine, based on the first collision avoiding constraint condition and the road region width information, a passable region for each vehicle in any traffic action type; and a second collision avoiding constraint condition determining subunit, configured to determine, based on the coordinates of each vehicle, a second collision avoiding constraint condition in the passable region that any two vehicles in the same traffic action type do not collide and any two vehicles in different traffic action types do not collide.

In some embodiments, in the passable region determining subunit, the determine, based on the first collision avoiding constraint condition and the road region width information, a passable region for each vehicle in any traffic action type includes: determine, based on the first collision avoiding constraint condition and the road region width information, in response to the traffic action type of the vehicle being a turning-left action, that the passable region for the vehicle in the turning-left action includes an opposite road region; and/or use, based on the first collision avoiding constraint condition and the road region width information, an intersection region in a road region in the plane coordinate system as the passable region for each vehicle to travel freely and flexibly.

In some embodiments, in the planning unit, the determines a loss function on the basis of the motion state parameters of each vehicle and the coordinates of each vehicle is determined by the following subunits: a first equation determining subunit, configured to determine, based on the motion state parameters of each vehicle, a first equation for a change of the motion state parameters of each vehicle; a second equation determining subunit, configured to determine, based on the coordinates of each vehicle, a second equation for a distance between any two vehicles; a third equation determining subunit, configured to determine, based on the coordinates of each vehicle, a third equation for distances from each vehicle to an X-axis and a Y-axis of the plane coordinate system; and a loss function determining subunit, configured to determine the loss function on a vehicle traffic state, based on the first equation, the second equation and the third equation.

In some embodiments, the apparatus for achieving vehicle-road coordination at an intersection without signal lights is applied to a vehicle-road coordination management system, and the vehicle-road coordination management system is configured to: acquire coordinates, a traffic action type and motion state parameters of each intelligent networked vehicle within a preset distance from the intersection using a sensing device and a communication device; and perform, based on the acquired coordinates, the traffic action type and the motion state parameters of each intelligent networked vehicle, the method for achieving vehicle-road coordination at an intersection without signal lights according to any one of the above, until the vehicle travels the preset distance out of the intersection.

In a fourth aspect, an embodiment of the present disclosure provides an apparatus for achieving vehicle-road coordination at an intersection without signal lights, including: an information unit, configured to acquire information used for trajectory planning, including: acquire road region width information, coordinates of obstacles and coordinates of each vehicle in a plane coordinate system, acquire a traffic action type of each vehicle, and acquire motion state parameters of each vehicle; where, the acquire coordinates of obstacles in a plane coordinate system includes: use a center point of a crossing in the plane coordinate system as a coordinate origin, acquire coordinates of four blocks adjacent to the crossing; each block including: a largest circle, a plurality of small circles that are inscribed with two sides of a circumscribed square of the largest circle adjacent to the origin, where sides of the circumscribed square of the largest circle are parallel to coordinate axes of the plane coordinate system, and radii of the plurality of small circles and a radius of the largest circle constitute a proportional decay sequence; a trajectory unit, configured to input the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and an action unit, configured to drive each vehicle to travel, on the basis of the planned trajectory information.

In a fifth aspect, an embodiment of the present disclosure provides a server, including: one or more processors; and a storage apparatus, storing one or more programs thereon. The one or more programs, when executed by the one or more processors, cause the one or more processors to implement the method according to any one of the above embodiments.

In a sixth aspect, an embodiment of the present disclosure provides a computer readable medium, storing a computer program thereon. The program, when executed by a processor, implements the method according to any one of the above embodiments.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

The present disclosure will be further described in detail below with reference to the accompanying drawings and embodiments. It should be understood that the specific embodiments described herein are only used to explain the related disclosure, but not to limit the present disclosure. In addition, it should be noted that, for the convenience of description, only the parts related to the related disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
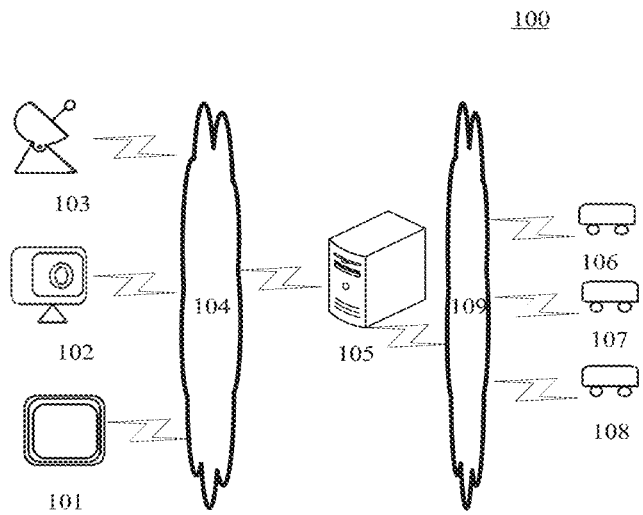
FIG. 1 is an exemplary system architecture diagram to which some embodiments of the present disclosure may be applied.

FIG. 1 shows an exemplary system architecture 100 of a method or apparatus for achieving vehicle-road coordination at an intersection without signal lights to which embodiments of the present disclosure may be applied.

As shown in FIG. 1, the system architecture 100 may include sensing devices 101, 102, 103, a network 104, a server 105, vehicles 106, 107, 108, and a network 109. The network 104 is used as a medium to provide a communication link between the sensing devices 101, 102, 103 and the server 105. The network 104 may include various connection types, such as wired, wireless communication links, or optical fiber cables. The network 109 is used as a medium to provide a communication link between the vehicles 106, 107, 108 and the server 105. The network 109 may also include various connection types, such as wired, wireless communication links, or optical fiber cables.

The sensing devices 101, 102, 103 interact with the server 105 via the network 104 to receive or send messages, or the like; the vehicles 106, 107, 108 interact with the server 105 via the network 109 to receive or send messages, or the like.

The sensing devices 101, 102, and 103 may be devices capable of sensing size information of each vehicle, motion state parameter information of each vehicle, position information of each vehicle, and a traffic action type of each vehicle, including but not limited to radars, visual sensors, and ground coils buried underground, etc. When the sensing devices 101, 102 and 103 are software, they may be installed in the electronic devices listed above. The sensing devices 101, 102 and 103 may be implemented, for example, as a plurality of software or software modules for providing distributed services, or as a single software or software module, which is not limited herein.

The server 105 may be a server that provides various services, for example, a backend server that provides driving command signals of planned trajectories to vehicles. The backend server may process such as analyze received vehicle traveling data and road information data, and drive each vehicle to travel according to a processing result. Correspondingly, the apparatus for achieving vehicle-road coordination at an intersection without signal lights may be provided in the server 105, which is not limited herein.

It should be noted that the server may be hardware or software. When the server is hardware, it may be implemented as a distributed server cluster composed of a plurality of servers, or may be implemented as a single server. When the server is software, for example, it may be implemented as a plurality of software or software modules for providing distributed services, or may be implemented as a single software or software module, which is not limited herein.

It should be appreciated that the numbers of sensing devices, networks, servers and vehicles in FIG. 1 are merely illustrative. Any number of sensing devices, networks, servers and vehicles may be provided depending on the implementation needs.

Figure 2:
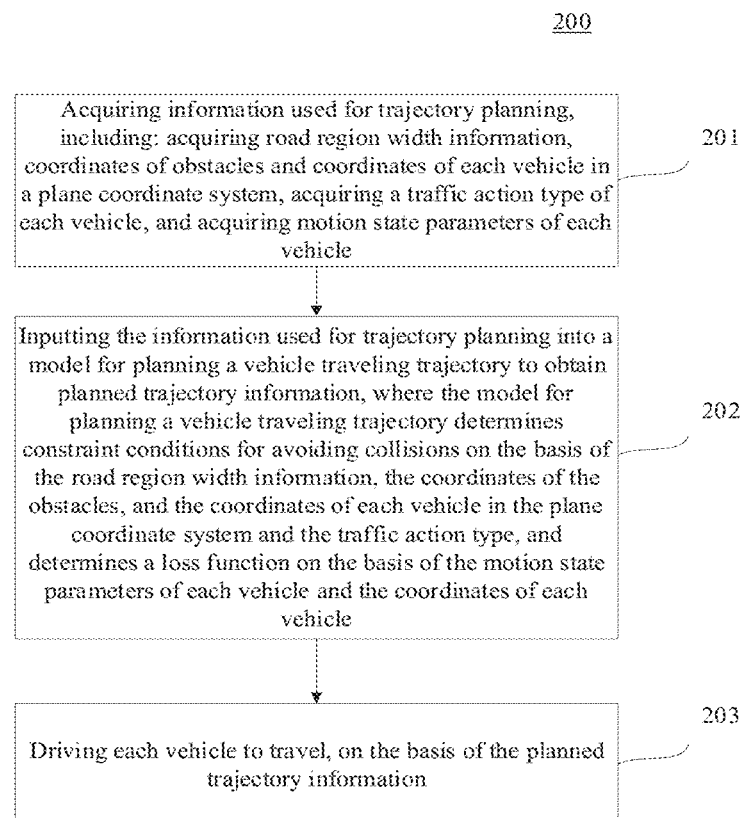
FIG. 2 is a flowchart of an embodiment of a method for achieving vehicle-road coordination at an intersection without signal lights according to the present disclosure.

With further reference to FIG. 2, illustrating a flow 200 of an embodiment of a method for achieving vehicle-road coordination at an intersection without signal lights according to the present disclosure. The method for achieving vehicle-road coordination at an intersection without signal lights includes the following steps.

Step 201, acquiring information used for trajectory planning, including: acquiring road region width information, coordinates of obstacles and coordinates of each vehicle in a plane coordinate system, acquiring a traffic action type of each vehicle, and acquiring motion state parameters of each vehicle.

In the present embodiment, an executing body (for example, the server shown in FIG. 1) of the method for achieving vehicle-road coordination at an intersection without signal lights may acquire the information used for trajectory planning locally, may also acquire the information from other transit devices. The traffic action type may be a traveling action for indicating a traffic intention. The information used for trajectory planning may be used to indicate road condition information in an intersection region (such as a crossing region, a T-junction region), and may be used as input of a model for planning a vehicle traveling trajectory; the information used for trajectory planning may include the road region width information, the coordinates of the obstacles and the coordinates of each vehicle in the plane coordinate system, the traffic action type of each vehicle, and the motion state parameters of each vehicle.

For example, the road region width information, the coordinates of the obstacles and the coordinates of each vehicle in the plane coordinate system, the traffic action type of each vehicle, and the motion state parameters of each vehicle may be acquired locally. Before acquiring the above information data locally, the executing body may map size information of each vehicle, motion state parameter information of each vehicle, and position information of the vehicle acquired from a sensing device to the plane coordinate system. Here, mapping is used to reflect an actual road condition in the intersection region to the plane coordinate system.

Specifically, the executing body may receive the size information, the motion state parameter information of each vehicle, and the position information of the vehicle from the sensing device through wired connection or wireless connection, and may acquire road width information and obstacle information in the intersection region from a map database; further, the executing body may map the road width information, the obstacle information and the vehicle information to the plane coordinate system, to obtain the road region width information, the coordinates of the obstacles and the coordinates of each vehicle in the plane coordinate system.

In some alternative implementations of the present embodiment, the traffic action type of each vehicle includes: one of turning-left action, going straight action, or turning-right action required for each vehicle to travel into any target lane.

For example, in a crossing region, vehicles may enter the intersection region from four directions from east, south, west or north (a positive direction of an X axis, a negative direction of the X axis, a positive direction of a Y axis, and a negative direction of the Y axis in the plane coordinate system). Vehicles entering the intersection region from each direction may exit the intersection and travel into the target lane according to 3 traffic action types: turning left, going straight, or turning right. Therefore, all vehicles passing through 4 intersections may be divided into 12 traffic action types. Vehicles exit the intersection from west to east are defined according to 3 traffic action types as: set A1 (set of left-turning vehicles), set A2 (set of going-straight vehicles), set A3 (set of right-turning vehicles); vehicles exit the intersection from east to west containing 3 traffic action types are defined as: set B1 (set of left-turning vehicles), set B2 (set of going-straight vehicles), set B3 (set of right-turning vehicles); vehicles exit the intersection from south to north containing 3 traffic action types are defined as: set C1 (set of left-turning vehicles), set C2 (set of going-straight vehicles), set C3 (set of right-turning vehicles); and vehicles exit the intersection from north to south containing 3 traffic action types are defined as: set D1 (set of left-turning vehicles), set D2 (set of going-straight vehicles), set D3 (set of right-turning vehicles), the traffic action type of any vehicle belongs to and only belongs to one of the above 12 sets.

In the present embodiment, when acquiring the coordinates of the obstacles in the plane coordinate system, the obstacles may be mapped to the plane coordinate system based on size information of the obstacles and position information of the obstacles on a road, to obtain coordinates of mapped shapes of the obstacles. The technology of mapping the obstacles to the plane coordinate system may be implemented by the existing technology or technologies developed in the future to map the obstacles to the plane coordinate system, which is not limited in the present disclosure. For example, the obstacles may be mapped to the plane coordinate system in the form of polygons, such as rectangles or squares. Assuming that there are $N^{obs}$ convex polygon obstacles in an XOY coordinate system, where the $j^{th}$ obstacle contains $NP_j$ vertices $V_{j1} \sim V_{jNP_j}$. Without loss of generality, it is possible to model for collision avoiding constraints between a vehicle i and the obstacle j ($j=1, \ldots, N_{obs}$). A collision on a two-dimensional plane must originate at a vertex, here, the vertex may be a vertex of the body of the vehicle or a vertex of the convex polygon obstacle. This means that if it is possible to constrain the vertices of a body rectangle to be outside the polygonal obstacle at every moment, and to constrain the vertices of the polygonal obstacle to be outside the body rectangle, no collision may occur. Since positions of the vertices of the obstacle $V_{j1} \sim V_{jNP_j}$ and vertices of the body $A_i(t) \sim D_i(t)$ may be represented analytically at all times, so far we only need a constraint modeling method that can describe "a certain point is outside a certain convex polygon". This problem is abstracted to specifically consider how to describe the point P y) is outside the convex polygons $Q_1 \sim Q_n$ having n vertices.

The obstacles may be a plurality of convex polygon obstacles, then in the plane coordinate system, the vertex Q of the $j^{th}$ obstacle, that is, all the $NP_j$ vertices are respectively $V_{j1} \sim V_{jNP_j}$, and the coordinates of each vertex may be determined based on the size of the obstacle and the position of the obstacle.

Figure 3:
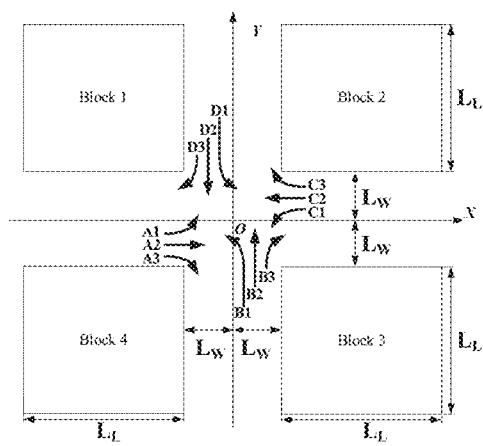
FIG. 3 is a schematic diagram of an application scenario in which road width information, obstacle information and vehicle information are mapped to a plane coordinate system according to an embodiment of the present disclosure.

Referring to FIG. 3, FIG. 3 shows a schematic diagram of an application scenario in which road width information, obstacle information and vehicle information are mapped to a plane coordinate system. The road width information of a crossing region is mapped to the plane coordinate system to obtain road region width information $L_{road\_width}$ (abbreviated as LW in the figure); information of rectangular obstacles block 1 (hereinafter abbreviated as Block1), block 2 (hereinafter abbreviated as Block2), block 3 (hereinafter abbreviated as Block3), and block 4 (hereinafter abbreviated as Block4) is mapped to the plane coordinate system to obtain coordinates of the rectangular obstacles. For example, vertex coordinates of Block1 close to the coordinate origin are $(-L_W, L_W)$, vertex coordinates of Block3 close to the X axis and far from the origin are $(L_W+L_L, -L_W)$, and $L_L$ is a length of the rectangular obstacle. At the same time, in order to visually indicate the traffic action type of each vehicle passing through the intersection region, FIG. 3 also shows the 12 traffic action types A1, A2, A3, B1, B2, B3, C1, C2, C3, D1, D2, and D3.

Returning to FIG. 2, in some alternative implementations of the present embodiment, the obstacles may be mapped to the plane coordinate system in a form of a square, based on size information of the obstacles and position information of the obstacles on a road, and the square may be replaced with a plurality of inscribed circles of the square, where each inscribed circle is tangent to two sides of the square adjacent to an inner corner of the square near an origin of the plane coordinate system.

For example, an obstacle having a square contour may be mapped to the plane coordinate system, or mathematical geometric operations may also be used to determine the smallest square that can contain an obstacle having a convex polygon contour, then based on the size information of the obstacle, a length and a width of the square in the coordinate system may be determined, so as to obtain coordinates of vertices of the square. A plurality of inscribed circles of the square are used to replace the square, where each inscribed circle is tangent to the two sides of the square adjacent to the inner corner of the square near the origin of the plane coordinate system, and the obtained plurality of inscribed circles are reflected again in the plane coordinate system as the square obstacle.

In some alternative implementations of the present embodiment, taking a circle, that uses a side length of the square as a diameter and a center of the square as a center, as the largest inscribed circle of the square; and using the plurality of circles of the square that are tangent to the two sides of the square adjacent to the inner corner of the square near the origin of the plane coordinate system as a plurality of small inscribed circles of the square, where radii of the plurality of small inscribed circles and a radius of the largest inscribed circle constitute a proportional decay sequence.

Figure 4:
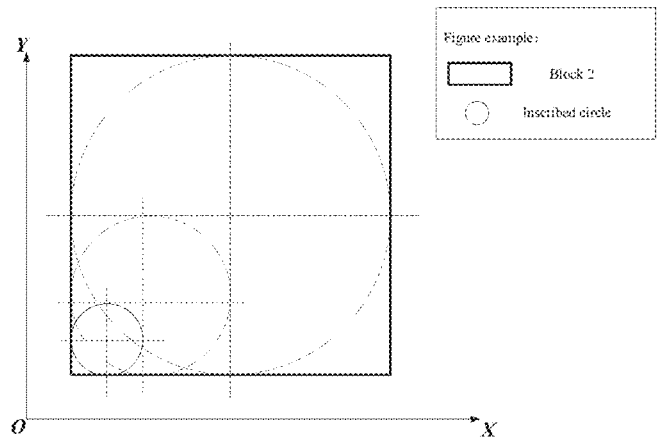
FIG. 4 is a schematic diagram of representing an obstacle in the form of a plurality of inscribed circles according to an embodiment of the present disclosure.

Referring to FIG. 4, FIG. 4 shows a schematic diagram of representing an obstacle in the form of a plurality of inscribed circles. Using a square obtained after Block2 is mapped to a first quadrant as an example, a common ratio of the proportional decay sequence is preset to 0.5, using the side length of the square as the diameter, and using the circle that uses the center of the square as the center as the largest inscribed circle of the square; then the plurality of circles that are tangent to the two sides of the square adjacent to the inner corner of the square near the origin of the plane coordinate system, whose radii and the radius of the largest inscribed circle constitute the proportional decay sequence, are used as a plurality of small inscribed circles of the square obstacle.

In the present embodiment, when acquiring coordinates of each vehicle, based on size information of each vehicle and position information of the vehicle on a road, each vehicle may be mapped to the plane coordinate system in a form of a rectangle, to obtain a vertex P of the $i^{th}$ vehicle at a time t, that is, the abscissa $A_{ix}(t)$, $B_{ix}(t)$, $C_{ix}(t)$, $D_{ix}(t)$ of four vertices of the rectangular contour, and the ordinate $A_{iy}(t)$, $B_{iy}(t)$, $C_{iy}(t)$, $D_{iy}(t)$.

In some alternative implementations of the present embodiment, each vehicle may be mapped to the plane coordinate system in a form of a rectangle, based on size information of each vehicle and position information of the vehicle on a road; and the rectangle may be replaced with symmetrical double circumscribed circles of the rectangle, to obtain coordinates of centers and a radius of the symmetrical double circumscribed circles of the rectangle in the plane coordinate system, where the symmetrical double circumscribed circles are the smallest symmetrical double circumscribed circles capable of containing the rectangle.

For example, both the centers of the symmetrical double circumscribed circles may be set on a symmetry axis of the rectangle, and a radius that can cover the rectangle may be determined based on the centers to obtain the smallest symmetrical double circumscribed circles.

In the above embodiment, by setting the traffic action type, a passable region for each vehicle may be defined. The obstacles may be represented in the form of a plurality of inscribed circles, and the vehicle may be represented in the form of symmetrical double circumscribed circles, in this way, the collision avoiding constraints between polygons in the model for planning a vehicle traveling trajectory may be converted into convex constraints, furthermore, the complexity of solving the model for planning a vehicle traveling trajectory can be reduced, so that a trajectory of each vehicle output by the model is more accurate, and trajectories between vehicles passing through the intersection region are more coordinated, therefore, the traffic efficiency of each vehicle in the intersection region can be improved.

Step 202, inputting the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle.

In the present embodiment, the model for planning a vehicle traveling trajectory includes the constraint conditions for avoiding collisions, the loss function and a vehicle motion differential equation set, where the vehicle motion differential equation set may be obtained based on a motion equation of the vehicle; the constraint conditions for avoiding collisions are determined on the basis of the road region width information, the coordinates of the obstacles, and the coordinates of each vehicle in the plane coordinate system and the traffic action type of each vehicle, and the loss function is determined on the basis of the motion state parameters of each vehicle and the coordinates of each vehicle. The loss function is used to reflect optimization demands for traffic efficiency, comfort performance, and safety performance.

In some alternative implementations of the present embodiment, determining a first collision avoiding constraint condition that each vehicle does not collide with the obstacles at any time t in any traffic action type based on the road region width information, the coordinates of the obstacles and the coordinates of each vehicle; determining, based on the first collision avoiding constraint condition and the road region width information, a passable region for each vehicle in any traffic action type; and determining, based on the coordinates of each vehicle, a second collision avoiding constraint condition in the passable region that any two vehicles in the same traffic action type do not collide and any two vehicles in different traffic action types do not collide.

Figure 5:
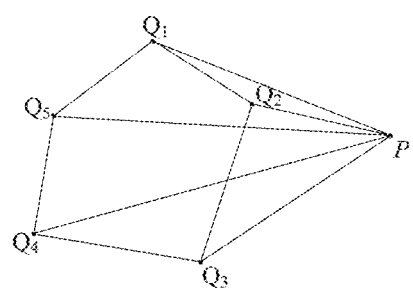
FIG. 5 is a schematic diagram of determining that a vertex of a vehicle is outside a convex polygon obstacle according to an embodiment of the present disclosure.

For example, when determining the first collision avoiding constraint condition, a constraint modeling method of "a vertex of a vehicle is outside a convex polygon obstacle" may be used to determine the constraint condition. Referring to FIG. 5, FIG. 5 shows an application scenario diagram of determining that a vertex of a vehicle is outside a convex polygon obstacle. The vertex P of the vehicle and each two adjacent vertices of the convex polygon obstacle respectively form a triangle, and areas of these triangles are accumulated. If a sum of the areas is greater than an area of the convex polygon, the point P is outside the convex polygon, otherwise the point P is on one side of the convex polygon obstacle or inside the convex polygon obstacle. Thus, an equation set where the point P is outside the convex polygon obstacle may be established:

$$S_{\triangle PQ_nQ_1} + \sum_{k=1}^{n-1} S_{\triangle PQ_kQ_{k+1}} > S_{\square Q_1Q_2\cdots Q_n},$$

where $S_{\triangle}$ represents the area of the corresponding triangle, $S_{\square}$ represents the area of the convex polygon, and $S_{\triangle}$ is solved by coordinates of vertices of the triangle.

Using $S_{\triangle PQ_kQ_{k+1}}$ as an example, if the coordinates of the vertices of the triangle are: $P=(x,y)$ $Q_k=(X_{Qk}, y_{Qk})$ and $Q_{k+1}=(X_{Q(k+1)}, y_{Q(k+1)})$ then based on the coordinates of the vertices of the triangle and the area of the triangle, the following equation may be obtained:

$$S_{\triangle PQ_kQ_{k+1}} = 1/2 \cdot |x \cdot y_{Qk} + x_{Qk} \cdot y_{Q(k+1)} + x_{Q(k+1)} \cdot y - x \cdot y_{Q(k+1)} - x_{Qk} \cdot y - x_{Q(k+1)} \cdot y_{Qk}|.$$

After solving the equation set, a general constraint condition that the point P is outside the vertices $Q_1 \sim Q_n$ of the convex polygon obstacle may be obtained: PointOutOfPolygon(P, $Q_1 \ldots Q_n$).

Based on this, the collision avoiding constraint condition between the $j^{th}$ obstacle $V_{j1}V_{j2} \ldots V_{jNP_j}$ and the body rectangle $A_iB_iC_iD_i$ may be established:

$$\begin{cases} PointOutOfPolygon(\chi, V_{j1} \sim V_{jNP_j}), \chi \in \{A_i(t), \ldots, D_i(t)\} \\ PointOutOfPolygon(\chi, A_i(t) \sim D_i(t)), \chi \in \{V_{j1}, \ldots, V_{jNP_j}\} \end{cases}.$$

Figure 6:
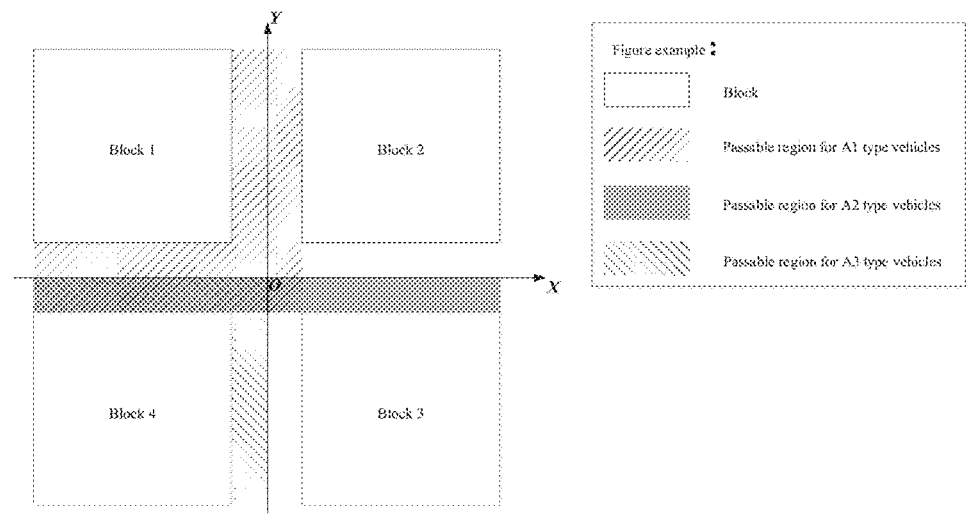
FIG. 6 is an application scenario diagram of determining a passable region for each vehicle according to an embodiment of the present disclosure.

From the above, the collision avoiding constraint condition between the vehicle i and all the obstacles may be established as:

$$\begin{cases} PointOutOfPolygon\left(\chi, V_{j1} \sim V_{jNP_j}\right), \chi \in \{A_i(t), \ldots, D_i(t)\} \\ PointOutOfPolygon\left(\chi, A_i(t) \sim D_i(t)\right), \chi \in \{V_{j1}, \ldots, V_{jNP_j}\} \end{cases},$$
$$t \in [0, t_f], \ j = 1, \ldots, N_{obs}.$$

and abbreviated to:

VehicleOutOfPolygon($A_i(t)B_i(t)C_i(t)D_i(t), V_{j1} \sim V_{jNP_j}$),
$t \in [0,t_f], j=1, \ldots, N_{obs}$, With further reference to FIG. 6, FIG. 6 shows an application scenario diagram of determining a passable region for each vehicle in any traffic action type. When vehicles enter an intersection from west to east, each vehicle corresponds to the traffic action type of A1, A2, or A3. In an entire motion time domain [0, $t_f$] using the A3 type as an example, vehicles in this traffic action type always keep travelling in a region below a straight line y=0 and in a left region of a straight line x=0. Since there is the rectangular obstacle Block4 in this region, the A3 type vehicles need to additionally avoid the rectangular obstacle Block4 during traveling, that is, a region occupied by the Block4 rectangular obstacle is removed from a semi-enclosed region enclosed by the two straight lines, which is the passable region for the A3 type vehicles. Similarly, vehicles belonging to the A2 type always keep traveling in a strip region below the straight line Y=0 and above a straight line y=−L$_{road\_width}$ (half of the road region width). The passable region for vehicles belonging to the A1 type is set in the same way as for the A3 type vehicles, but opposite road space may also be additionally used as part of the passable region for the A1 type vehicles. Allowing left-turning vehicles to use the opposite road may enable the left-turning vehicles to make better use of the road space and improve an overall traffic efficiency. From the above, the passable regions for the A1, A2, and A3 type vehicles may be respectively defined as:

$$\begin{cases} \chi \leq L_{road\_width}, \chi \in \{A_{ix}(t), B_{ix}(t), C_{ix}(t), D_{ix}(t)\} \\ \gamma \geq -L_{road\_width}, \gamma \in \{A_{iy}(t), B_{iy}(t), C_{iy}(t), D_{iy}(t)\}, \ t \in [0, t_f], i \in A1; \\ VehicleOutOfPolygon\ (A_i(t)B_i(t)C_i(t)D_i(t), \text{Block1}) \end{cases}$$

$-L_{road\_width} \leq \gamma \leq 0, \gamma \in \{A_{iy}(t), B_{iy}(t), C_{iy}(t), D_{iy}(t)\}, t \in [0, t_f], i \in A2;$ $$\begin{cases} \chi \leq 0, \chi \in \{A_{ix}(t), B_{ix}(t), C_{ix}(t), D_{ix}(t)\} \\ \gamma \leq 0, \gamma \in \{A_{iy}(t), B_{iy}(t), C_{iy}(t), D_{iy}(t)\}, \ \ \ \ \ t \in [0, t_f], i \in A3. \\ VehicleOutOfPolygon\ (A_i(t)B_i(t)C_i(t)D_i(t), \text{Block4}) \end{cases}$$

where, $A_{ix}(t)$, $B_{ix}(t)$, $C_{ix}(t)$, $D_{ix}(t)$ respectively refer to the abscissa of the four vertices of the vehicle rectangular contour of the $i^{th}$ vehicle at time t; similarly, $A_{iy}(t)$, $B_{iy}(t)$, $C_{iy}(t)$, $D_{iy}(t)$ respectively refer to the ordinate of the four vertices of the vehicle rectangular contour of the $i^{th}$ vehicle at time t; and VehicleOutOfPolygon($\Gamma, \Upsilon$) refers to the collision avoiding constraint condition used to describe non-collision between two convex polygons $\Gamma$ and $\Upsilon$.

For example, after the passable region is determined, the second collision avoiding constraint condition may be determined, and the second collision avoiding constraint condition is used to implement that in a whole process of each vehicle moving in the corresponding passable region, vehicle types with overlapping passable regions do not collide with each other, and vehicles within each type do not collide. If the collision avoiding constraint condition for the vehicle i and the vehicle j at time t is recorded as VehicleOutOfVehicle(i,j,t) the second collision avoiding constraint condition may be:

VehicleOutOfPolygon($A_i(t)B_i(t)C_i(t)D_i(t), A_j(t)B_j(t)C_j(t)D_j(t)$).

Specifically, the second collision avoiding constraint condition is:

VehicleOutOfVehicle(i,j,t),i∈A1, j∈A2∪A3∪B1∪B2∪B3∪C1∪C2∪C3∪D1∪D2∪D3;

VehicleOutOfVehicle(i,j,t),i∈A2, j∈A3∪B1∪B2∪B3∪C1∪D1∪D2;

VehicleOutOfVehicle(i,j,t),i∈A3,j∈B1∪C1∪D1∪D2;

VehicleOutOfVehicle(i,j,t),i∈B1, j∈B2∪B3∪C1∪C2∪C3∪D1∪D2∪D3;

VehicleOutOfVehicle(i,j,t),i∈B2,
j∈B3∪C1∪C2∪C3∪D1;

VehicleOutOfVehicle(i,j,t),i∈B3,j∈C1∪D1;

VehicleOutOfVehicle(i,j,t),i∈C1,
j∈C2∪C3∪D1∪D2∪D3;

VehicleOutOfVehicle(i,j,t),i∈C2,j∈C3∪D1∪D2∪D3;

VehicleOutOfVehicle(i,j,t),i∈C3,j∈D1;

VehicleOutOfVehicle(i,j,t),i∈D1,j∈D2∪D3;

VehicleOutOfVehicle(i,j,t),i∈D2,j∈D3;

VehicleOutOfVehicle(i,j,t),∀i,j∈A1,i≠j;

VehicleOutOfVehicle(i,j,t),∀i,j∈A2,i≠j;

VehicleOutOfVehicle(i,j,t),∀i,j∈A3,i≠j;

VehicleOutOfVehicle(i,j,t),∀i,j∈B1,i≠j;

VehicleOutOfVehicle(i,j,t),∀i,j∈B2,i≠j;

VehicleOutOfVehicle(i,j,t),∀i,j∈B3,i≠j;

VehicleOutOfVehicle(i,j,t),∀i,j∈C1,i≠j;

VehicleOutOfVehicle(i,j,t),∀i,j∈C2,i≠j;

VehicleOutOfVehicle(i,j,t),∀i,j∈C3,i≠j;

VehicleOutOfVehicle(i,j,t),∀i,j∈D1,i≠j;

VehicleOutOfVehicle(i,j,t),∀i,j∈D2,i≠j;

VehicleOutOfVehicle(i,j,t),∀i,j∈D3,i≠j.

In some embodiments, the determining, based on the first collision avoiding constraint condition and the road region width information, a passable region for each vehicle in any traffic action type includes: determining, based on the first collision avoiding constraint condition and the road region width information, in response to the traffic action type of the vehicle being a turning-left action, that the passable region for the vehicle in the turning-left action includes an opposite road region. In this way, the left-turning vehicle may make better use of the road space, which improves the overall traffic efficiency.

Alternatively, or additionally, the determining, based on the first collision avoiding constraint condition and the road region width information, a passable region for each vehicle in any traffic action type, may include: using, based on the first collision avoiding constraint condition and the road region width information, an intersection region in a road region in the plane coordinate system as the passable region for each vehicle to travel freely and flexibly. In this way, the intersection region may be used as the passable region for the vehicle to travel freely and flexibly, so that the space of the intersection region may be better used and the overall traffic efficiency may be improved.

In some alternative implementations of the present embodiment, determining, based on the motion state parameters of each vehicle, a first equation for a change of the motion state parameters of each vehicle; determining, based on the coordinates of each vehicle, a second equation for a distance between any two vehicles; determining, based on the coordinates of each vehicle, a third equation for distances from each vehicle to an X-axis and a Y-axis of the plane coordinate system; and determining the loss function, based on the first equation, the second equation and the third equation.

For example, based on the motion state parameters of the vehicle, the first equation for the change of the motion state parameters of the vehicle is determined. The first equation $J_{comfort}$ may be an equation that reflects the comfort performance of each vehicle passing through the intersection region, then when the vehicle passes through the intersection region, the motion state parameters of the vehicle (such as speed, acceleration, angular velocity, displacement angle) change little, and at the start time 0, each vehicle starts to travel smoothly and at a constant speed to achieve the comfort performance. Therefore, the first equation $J_{comfort}$ may be the equation for the change of the motion state parameters. For example, a buffer region may be set in the intersection region, in which the vehicle changes the motion state parameters, and finally, from the start time 0 when passing through the intersection region to finish time $t_f$ after passing through the intersection region, each vehicle travels at the same rate and at a constant speed in the direction of a current road section. When passing through the intersection region, the acceleration, angular velocity, and displacement angle of each vehicle may all be 0, then there are equations as follows:

$$[x_i(0),y_i(0),v_i(0),\alpha_j(0),\varphi_j(0),\omega_j(0)]=[x_i, l\ y_i, v_{common},0,0,0], i \in \{1, \ldots, N\};$$

$$\theta_i(0)=0, i \in A1 \cup A2 \cup A3;$$

$$\theta_i(0)=\pi/2, i \in B1 \cup B2 \cup B3;$$

$$\theta_i(0)=\pi, i \in C1 \cup C2 \cup C3;$$

$$\theta_i(0)=-\pi/2, i \in D1 \cup D2 \cup D3.$$

Figure 7:
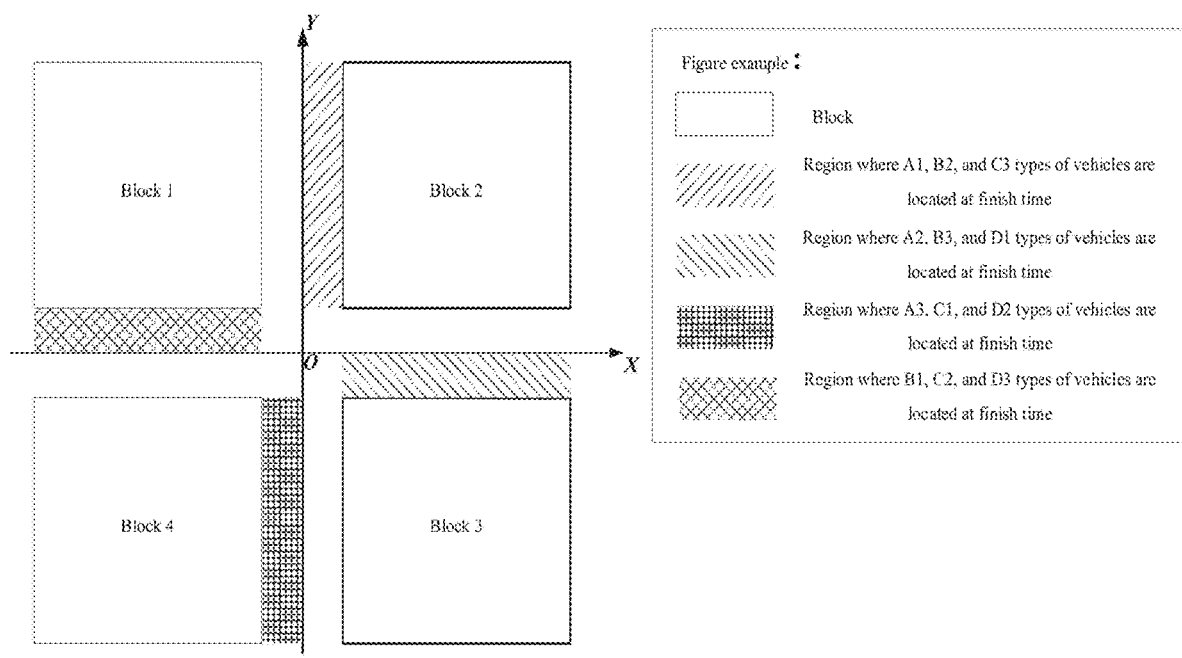
FIG. 7 is an application scenario diagram of a region where each vehicle is located at finish time according to an embodiment of the present disclosure.

Referring to FIG. 7, FIG. 7 shows an application scenario diagram of a region where each vehicle is located at finish time. Each vehicle has the following equations at the finish time $t_f$:

$$[v_i(t_f), a_i(t_f), \phi_i(t_f), \omega_i(t_f)] = [v_{common},0,0,0], i \in \{1, \ldots, N_V\};$$

$$\begin{cases} 0 \le \chi \le L_{road\_width}, \chi \in \{A_{ix}(t_f),B_{ix}(t_f),C_{ix}(t_f),D_{ix}(t_f)\} \\ \gamma \ge L_{road\_width}, \gamma \in \{A_{iy}(t_f),B_{iy}(t_f),C_{iy}(t_f),D_{iy}(t_f)\} \end{cases},$$

$i \in A1 \cup B2 \cup C3;$ $$\begin{cases} \chi \le -L_{road\_width}, \chi \in \{A_{ix}(t_f),B_{ix}(t_f),C_{ix}(t_f),D_{ix}(t_f)\} \\ 0 \le \gamma \le L_{road\_width}, \gamma \in \{A_{iy}(t_f),B_{iy}(t_f),C_{iy}(t_f),D_{iy}(t_f)\} \end{cases},$$

$i \in B1 \cup C2 \cup D3;$ $$\begin{cases} -L_{road\_width} \le \chi \le 0, \chi \in \{A_{ix}(t_f),B_{ix}(t_f),C_{ix}(t_f),D_{ix}(t_f)\} \\ \gamma \le -L_{road\_width}, \gamma \in \{A_{iy}(t_f),B_{iy}(t_f),C_{iy}(t_f),D_{iy}(t_f)\} \end{cases},$$

$i \in A3 \cup C1 \cup D2;$ $$\begin{cases} \chi \ge L_{road\_width}, \chi \in \{A_{ix}(t_f),B_{ix}(t_f),C_{ix}(t_f),D_{ix}(t_f)\} \\ -L_{road\_width} \le \gamma \le 0, \gamma \in \{A_{iy}(t_f),B_{iy}(t_f),C_{iy}(t_f),D_{iy}(t_f)\} \end{cases},$$

$i \in A2 \cup B3 \cup D1;$ $$\theta_i(t_f) = \theta_i(0) + \pi/2, i \in A1 \cup B1 \cup C1 \cup D1;$$

$$\theta_i(t_f) = \theta_i(0), i \in A2 \cup B2 \cup C2 \cup D2;$$

$$\theta_i(t_f) = \theta_i(0) - \pi/2, i \in A3 \cup B3 \cup C3 \cup D3.$$

where, $v_{common} > 0$ is a rate value of each vehicle traveling smoothly and at a constant speed, $(x_i, y_i)$ is coordinates of a starting position of the $i^{th}$ vehicle, $\theta_i(0)$ is an angle between a line connecting the two circle centers and the coordinate X-axis at the start time when the $i^{th}$ vehicle represented by symmetrical double circumscribed circles passes through the intersection region, and $\theta_i(t_f)$ is an angle between a line connecting the two circle centers and the coordinate X-axis at the finish time when the $i^{th}$ vehicle represented by symmetrical double circumscribed circles passes through the intersection region.

For example, based on the coordinates of each vehicle, the second equation is determined for the distance between any two vehicles. The second equation may be an equation $J_{safety}$ that reflects the safety performance of each vehicle passing through the intersection region, for indicating the distance between the vehicles. For example, a buffer region may be set in the intersection region, in which each vehicle adjusts its own motion state parameters, at the start time, each vehicle starts to travel smoothly and at a constant speed, and the distance between each vehicle also reaches a preset value (the distance between two vehicles may be calculated by the coordinates of the vehicles).

For example, based on the coordinates of each vehicle, the third equation for distances from each vehicle to the X-axis and the Y-axis of the plane coordinate system is determined. The third equation may be an equation that reflects the traffic efficiency, and may be the distances from all vehicles reaching the target lane to the X-axis and Y-axis of the plane coordinate system at the finish time. The third equation may indicate the finish time t f of each vehicle passing through the intersection region, and the vehicle has traveled as far as possible on the respective target lane, that is, the following equations may be obtained:

$$J_{traffic\ efficiency} = -\left( \sum_{i \in A1 \cup B2 \cup C3} y_i(t_f) + \sum_{i \in A2 \cup B3 \cup D1} x_i(t_f) - \sum_{i \in A3 \cup C1 \cup D2} y_i(t_f) - \sum_{i \in B1 \cup C2 \cup D3} x_i(t_f) \right).$$

$$[v_i(t_f), a_i(t_f), \phi_i(t_f), \omega_i(t_f)] = [v_{common},0,0,0], i \in \{1, \ldots, N_V\};$$

$$\begin{cases} 0 \le \chi \le L_{road\_width}, \chi \in \{A_{ix}(t_f),B_{ix}(t_f),C_{ix}(t_f),D_{ix}(t_f)\} \\ \gamma \ge L_{road\_width}, \gamma \in \{A_{iy}(t_f),B_{iy}(t_f),C_{iy}(t_f),D_{iy}(t_f)\} \end{cases},$$

$i \in A1 \cup B2 \cup C3;$

-continued $$\begin{cases} \chi \le -L_{road\_width}, \chi \in \{A_{ix}(t_f), B_{ix}(t_f), C_{ix}(t_f), D_{ix}(t_f)\} \\ 0 \le \gamma \le L_{road\_width}, \gamma \in \{A_{iy}(t_f), B_{iy}(t_f), C_{iy}(t_f), D_{iy}(t_f)\} \end{cases},$$

$i \in B1 \cup C2 \cup D3;$ $$\begin{cases} -L_{road\_width} \le \chi \le 0, \chi \in \{A_{ix}(t_f), B_{ix}(t_f), C_{ix}(t_f), D_{ix}(t_f)\} \\ \gamma \le -L_{road\_width}, \gamma \in \{A_{iy}(t_f), B_{iy}(t_f), C_{iy}(t_f), D_{iy}(t_f)\} \end{cases},$$

$i \in A3 \cup C1 \cup D2;$ $$\begin{cases} \chi \ge L_{road\_width}, \chi \in \{A_{ix}(t_f), B_{ix}(t_f), C_{ix}(t_f), D_{ix}(t_f)\} \\ -L_{road\_width} \le \gamma \le 0, \gamma \in \{A_{iy}(t_f), B_{iy}(t_f), C_{iy}(t_f), D_{iy}(t_f)\} \end{cases},$$

$i \in A2 \cup B3 \cup D1;$ $\theta_i(t_f) = \theta_i(0) + \pi/2, i \in A1 \cup B1 \cup C1 \cup D1;$ $\theta_i(t_f) = \theta_i(0), i \in A2 \cup B2 \cup C2 \cup D2;$ $\theta_i(t_f) = \theta_i(0) - \pi/2, i \in A3 \cup B3 \cup C3 \cup D3.$ where, $t_f$ is the finish time of each vehicle passing through the intersection region, and the third equation can encourage many vehicles that should be able to reach the finish time constraint earlier to keep moving forward.

For example, based on the first equation, the second equation and the third equation, the loss function on a vehicle traffic state is determined, the third equation may be $J = w_1 \cdot J_{traffic\ efficiency} + w_2 \cdot J_{comfort} + w_3 \cdot J_{safety}$, where $w_1$, $w_2$, $w_3 > 0$ are weight coefficients.

Step 203, driving each vehicle to travel, on the basis of the planned trajectory information.

In the present embodiment, based on the trajectory information planned in step 202, the executing body may send a driving command signal indicating the planned trajectory information to a communication apparatus of each vehicle, and a processor of each vehicle controls the vehicle to travel based on the driving command signal received by the communication apparatus.

In the method for achieving vehicle-road coordination at an intersection without signal lights provided by embodiments of the present disclosure, the model for planning a vehicle traveling trajectory established based on the road region width information, the coordinates of the obstacles, the coordinates of each vehicle and the traffic action type of each vehicle may make the planned trajectory of each vehicle output by the model more accurate, so that travel trajectories between vehicles are more flexible and coordinated, thereby avoiding congestion caused by the vehicles in the intersection region, which can greatly improve the traffic efficiency at the intersection.

In some alternative implementations of the present embodiment, the method for achieving vehicle-road coordination at an intersection without signal lights is applied to a vehicle-road coordination management system, and the vehicle-road coordination management system is configured to: acquire coordinates, a traffic action type and motion state parameters of each intelligent networked vehicle within a preset distance from the intersection using a sensing device and a communication device; and perform, based on the acquired coordinates, the traffic action type and the motion state parameters of each intelligent networked vehicle, the method for achieving vehicle-road coordination at an intersection without signal lights according to any one of the above, until the vehicle travels the preset distance out of the intersection.

In this implementation, after the intelligent networked vehicle is taken over, the vehicle-road coordination management system triggers a multi-vehicle coordination trajectory planning task, which is completed by a planning module of the system, thereby implementing the method for achieving vehicle-road coordination at an intersection without signal lights. The planning module re-plans motion behaviors of all intelligent networked vehicles currently within an intersection range, and then sends the planning to each intelligent networked vehicle for execution through a communication module of the system. After an intelligent networked vehicle leaves the intersection takeover range, the vehicle may be removed from a system control list. Therefore, the multi-vehicle coordination trajectory planning task that can be implemented by the vehicle-road coordination management system can improve the traffic efficiency of each intelligent networked vehicle.

Figure 8:
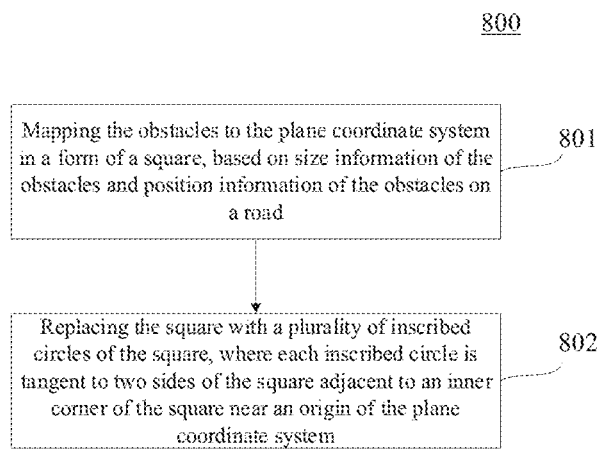
FIG. 8 is a flowchart of an embodiment of determining coordinates of obstacles in the method for achieving vehicle-road coordination at an intersection without signal lights according to the present disclosure.

With further reference to FIG. 8, FIG. 8 is a flow 800 of an embodiment of determining coordinates of obstacles in the method for achieving vehicle-road coordination at an intersection without signal lights according to the present embodiment. The flow of the method for determining coordinates of obstacles includes the following steps.

Step 801, mapping the obstacles to the plane coordinate system in a form of a square, based on size information of the obstacles and position information of the obstacles on a road.

In the present embodiment, based on the size information of the obstacles and the position information of the obstacles on the road, the irregular obstacles may be mapped to the plane coordinate system in the form of a convex polygon, to obtain coordinates of each vertex of the convex polygon. However, in order to further simplify the established model, the obstacles in the scenario of the intersection region may be set to be squares, or based on the size information of the obstacles and the position information of the obstacles, mathematical geometric operations may be used to map the convex polygon obstacles to the plane coordinate system into the smallest squares that can contain the convex polygons.

Step 802, replacing the square with a plurality of inscribed circles of the square, where each inscribed circle is tangent to two sides of the square adjacent to an inner corner of the square near an origin of the plane coordinate system.

In the present embodiment, when establishing the model for planning a vehicle traveling trajectory, in order to convert the collision avoiding constraints in the model from non-convex constraints to convex constraints, the plurality of inscribed circles of the square may be used to replace the square, or other shapes that can convert non-convex constraints in the model for planning a vehicle traveling trajectory to convex constraints may be used to replace the square. When replacing the square with the plurality of inscribed circles, each inscribed circle is tangent to the two sides of the square adjacent to the inner corner of the square near the origin of the plane coordinate system.

In some alternative implementations of the present embodiment, taking a circle, that uses a side length of the square as a diameter and a center of the square as a center, as the largest inscribed circle of the square; and using the plurality of circles of the square that are tangent to the two sides of the square adjacent to the inner corner of the square near the origin of the plane coordinate system as a plurality of small inscribed circles of the square, where radii of the plurality of small inscribed circles and a radius of the largest inscribed circle constitute a proportional decay sequence.

Figure 9:
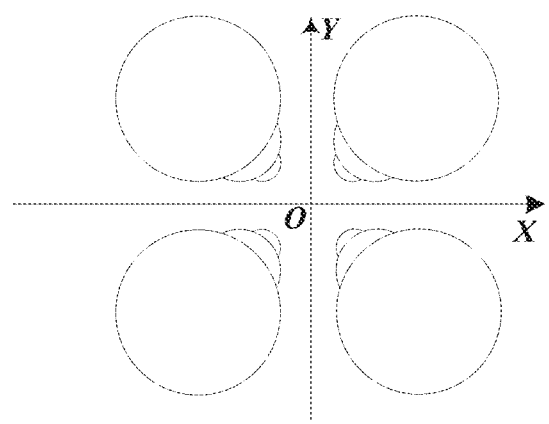
FIG. 9 is an application scenario diagram of representing obstacles in the form of a plurality of inscribed circles in the method for achieving vehicle-road coordination at an intersection without signal lights according to the present disclosure.

For example, referring to FIG. 9, FIG. 9 shows an application scenario diagram of representing obstacles in the form of a plurality of inscribed circles. The radius of the largest inscribed circle of the square obstacles is determined, then make the plurality of inscribed circles of the square obstacles with the common ratio of the proportional decay sequence being 0.5, to obtain the obstacles represented in the form of a plurality of inscribed circles.

In the present embodiment, the obstacles are finally represented in the form of a plurality of inscribed circles, and the collision avoiding constraints in the model for planning a vehicle traveling trajectory may be converted from non-convex constraints to convex constraints, thereby simplifying the complexity of the model, further reducing the difficulty of solving the model. Finally, the obtained planned trajectory of each vehicle is more accurate, and the traffic efficiency of each vehicle in the intersection region is improved.

Figure 10:
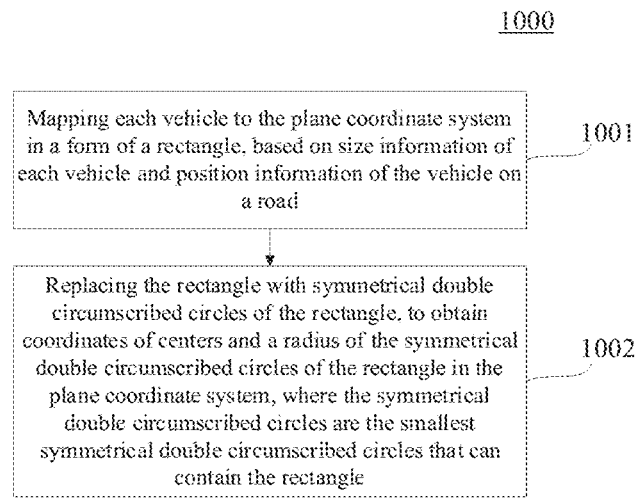
FIG. 10 is a flowchart of an embodiment of determining coordinates of each vehicle in the method for achieving vehicle-road coordination at an intersection without signal lights according to the present disclosure.

With further reference to FIG. 10, FIG. 10 is a flow 1000 of an embodiment of determining coordinates of each vehicle in the method for achieving vehicle-road coordination at an intersection without signal lights according to the present embodiment. The flow of the method for determining coordinates of each vehicle includes the following steps.

Step 1001, mapping each vehicle to the plane coordinate system in a form of a rectangle, based on size information of each vehicle and position information of the vehicle on a road.

In the present embodiment, the vehicle may be mapped to the plane coordinate system in the form of a rectangle, based on the size information and the position information of the vehicle, or the vehicle may be mapped to the plane coordinate system in the form of a rectangle that can cover itself based on a shape and size of a future vehicle.

Step 1002, replacing the rectangle with symmetrical double circumscribed circles of the rectangle, to obtain coordinates of centers and a radius of the symmetrical double circumscribed circles of the rectangle in the plane coordinate system, where the symmetrical double circumscribed circles are the smallest symmetrical double circumscribed circles that can contain the rectangle.

In the present embodiment, when establishing the model for planning a vehicle traveling trajectory, in order to convert the collision avoiding constraints in the model from non-convex constraints to convex constraints, the rectangle may be replaced with the symmetrical double circumscribed circles, or other shapes that can convert non-convex constraints in the model for planning a vehicle traveling trajectory to convex constraints may be used to replace the rectangle. The symmetrical double circumscribed circles may be the smallest symmetrical double circumscribed circles that can contain the rectangle.

Figure 11:
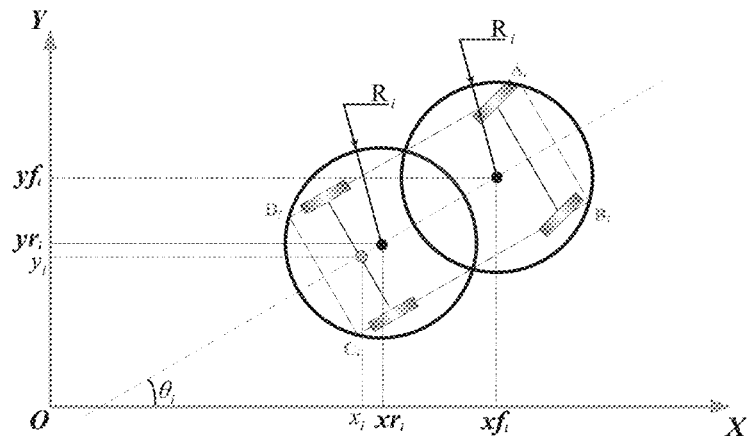
FIG. 11 is an application scenario diagram of representing a vehicle in the form of symmetrical double circumscribed circles in the method for achieving vehicle-road coordination at an intersection without signal lights according to the present disclosure.

Referring to FIG. 11, FIG. 11 is an application scenario diagram of representing a vehicle in the form of symmetrical double circumscribed circles. For the contour A,B,C,D; of the vehicle 1, circles with the points $(xr_i, yr_i)$ and $(xf_i, yf_i)$ as the centers of the circles and $R_i$ as the radius may be used to cover the contour. Therefore, the collision avoiding constraint condition between the vehicle i and the vehicle j at time t may be established, that is, the second collision avoiding constraint condition may be:

$$(xr_i(t)-xr_j(t))^2+(yr_i(t)-yr_j(t))^2 \geq (R_i+R_j)^2$$

$$(xf_i(t)-xf_j(t))^2+(yf_i(t)-yf_j(t))^2 \geq (R_i+R_j)^2$$

$$, t \in [0,t_f], i,j \in \{1, \ldots, N_V\} i \neq j.$$

$$xr_i(t)-xf_j(t))^2+(yr_i(t)-yf_j(t))^2 \geq (R_i+R_j)^2$$

$$(xf_i(t)-xr_j(t))^2+(yf_i(t)-yr_j(t))^2 \geq (R_i+R_j)^2$$

Each rectangular vehicle is simplified into the form of symmetrical double circumscribed circles, and the square obstacles are simplified into the form of a plurality of inscribed circles. Finally, the first collision avoiding constraint condition for avoiding collision between each vehicle and the obstacles may also be simplified, detailed description thereof will be omitted.

In the present embodiment, the vehicle is finally represented in the form of symmetrical double circumscribed circles, and the collision avoiding constraints in the model for planning a vehicle traveling trajectory may be converted to convex constraints, thereby simplifying the complexity of the model, further reducing the difficulty of solving the model. Finally, the obtained planned trajectory of each vehicle is more accurate, and the traffic efficiency of each vehicle in the intersection region is improved.

In addition, the present disclosure further provides an embodiment of a method for achieving vehicle-road coordination at an intersection without signal lights, and the method embodiment includes the following steps.

First acquiring information used for trajectory planning, including: acquiring road region width information, coordinates of obstacles and coordinates of each vehicle in a plane coordinate system, acquiring a traffic action type of each vehicle, and acquiring motion state parameters of each vehicle.

Where, the acquiring coordinates of obstacles in a plane coordinate system includes: using a center point of a crossing in the plane coordinate system as a coordinate origin, acquiring coordinates of four blocks adjacent to the crossing; each block including: the largest circle, a plurality of small circles that are inscribed with two sides of a circumscribed square of the largest circle adjacent to the origin, where sides of the circumscribed square of the largest circle are parallel to coordinate axes of the plane coordinate system, and radii of the plurality of small circles and a radius of the largest circle constitute a proportional decay sequence.

Then, inputting the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle.

Finally, driving each vehicle to travel, on the basis of the planned trajectory information.

Those skilled in the art should understand that this method embodiment corresponds to the method embodiment shown in FIG. 2, and is different from the method embodiment shown in FIG. 2 in that this method embodiment further determines a series of obstacles based on future blocks in the form of circles (similar to the obstacles in the form of inscribed circles shown in FIG. 9). The obstacles make the collision avoiding constraints in the model for planning a vehicle traveling trajectory convex constraints, thereby simplifying the complexity of the model, further reducing the difficulty of solving the model. Finally, the obtained planned trajectory of each vehicle is more accurate, and the traffic efficiency of each vehicle in the intersection region is improved.

Figure 12:
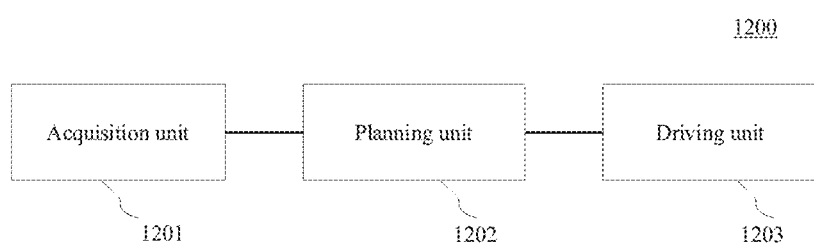
FIG. 12 is a schematic structural diagram of an embodiment of an apparatus for achieving vehicle-road coordination at an intersection without signal lights according to the present disclosure.

With further reference to FIG. 12, as an implementation of the method shown in the above figures, the present disclosure provides an embodiment of an apparatus for achieving vehicle-road coordination at an intersection without signal lights. The apparatus embodiment corresponds to the method embodiment shown in FIG. 2. Particularly, the apparatus may be applied in various electronic devices.

As shown in FIG. 12, an apparatus 1200 for achieving vehicle-road coordination at an intersection without signal lights provided in the present embodiment includes: an acquisition unit 1201, a planning unit 1202 and a driving unit 1203. The acquisition unit 1201 is configured to acquire road region width information, coordinates of obstacles and coordinates of each vehicle in a plane coordinate system, acquire a traffic action type of each vehicle, and acquire motion state parameters of each vehicle. The planning unit 1202 is configured to input the road region width information, the coordinates of the obstacles and the coordinates of each vehicle in the plane coordinate system, the traffic action type of each vehicle, and the motion state parameters of each vehicle into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle. The driving unit 1203 is configured to drive each vehicle to travel, on the basis of the planned trajectory information.

In some alternative implementations of the present embodiment, in the acquisition unit and the planning unit, the traffic action type of each vehicle includes: one of turning-left action, going straight action, or turning-right action required for each vehicle to travel into any target lane.

In some alternative implementations of the present embodiment, in the acquisition unit, the acquire coordinates of obstacles in a plane coordinate system includes: map the obstacles to the plane coordinate system in a form of a square, based on size information of the obstacles and position information of the obstacles on a road, and replace the square with a plurality of inscribed circles of the square, where each inscribed circle is tangent to two sides of the square adjacent to an inner corner of the square near an origin of the plane coordinate system.

In some alternative implementations of the present embodiment, in the acquisition unit, the acquire coordinates of each vehicle in a plane coordinate system includes: map each vehicle to the plane coordinate system in a form of a rectangle, based on size information of each vehicle and position information of the obstacles on a road, and replace the rectangle with symmetrical double circumscribed circles of the rectangle, to obtain coordinates of centers and a radius of the symmetrical double circumscribed circles of the rectangle in the plane coordinate system, where the symmetrical double circumscribed circles are the smallest symmetrical double circumscribed circles that can contain the rectangle.

In some alternative implementations of the present embodiment, in the acquisition unit, the replace the square with a plurality of inscribed circles to obtain coordinates of centers and a radius of the plurality of inscribed circles in the plane coordinate system includes: take a circle, that uses a side length of the square as a diameter and a center of the square as a center, as the largest inscribed circle of the square; and use the plurality of circles of the square that are tangent to the two sides of the square adjacent to the inner corner of the square near the origin of the plane coordinate system as a plurality of small inscribed circles of the square, where radii of the plurality of small inscribed circles and a radius of the largest inscribed circle constitute a proportional decay sequence.

In some alternative implementations of the present embodiment, in the planning unit, the determines constraint conditions for avoiding collisions on the basis of the road region width information, the coordinates of the obstacles, and the coordinates of each vehicle in the plane coordinate system and the traffic action type is determined by the following subunits: a first collision avoiding constraint condition determining subunit, configured to determine a first collision avoiding constraint condition that each vehicle does not collide with the obstacles at any time t in any traffic action type based on the road region width information, the coordinates of the obstacles and the coordinates of each vehicle; a passable region determining subunit, configured to determine, based on the first collision avoiding constraint condition and the road region width information, a passable region for each vehicle in any traffic action type; and a second collision avoiding constraint condition determining subunit, configured to determine, based on the coordinates of each vehicle, a second collision avoiding constraint condition in the passable region that any two vehicles in the same traffic action type do not collide and any two vehicles in different traffic action types do not collide.

In some alternative implementations of the present embodiment, in the passable region determining subunit, the determine, based on the first collision avoiding constraint condition and the road region width information, a passable region for each vehicle in any traffic action type includes: determine, based on the first collision avoiding constraint condition and the road region width information, in response to the traffic action type of the vehicle being a turning-left action, that the passable region for the vehicle in the turning-left action includes an opposite road region; and/or use, based on the first collision avoiding constraint condition and the road region width information, an intersection region in a road region in the plane coordinate system as the passable region for each vehicle to travel freely and flexibly.

In some alternative implementations of the present embodiment, in the planning unit, the determines a loss function on the basis of the motion state parameters of each vehicle and the coordinates of each vehicle is determined by the following subunits: a first equation determining subunit, configured to determine, based on the motion state parameters of each vehicle, a first equation for a change of the motion state parameters of each vehicle; a second equation determining subunit, configured to determine, based on the coordinates of each vehicle, a second equation for a distance between any two vehicles; a third equation determining subunit, configured to determine, based on the coordinates of each vehicle, a third equation for distances from each vehicle to an X-axis and a Y-axis of the plane coordinate system; and a loss function determining subunit, configured to determine the loss function on a vehicle traffic state, based on the first equation, the second equation and the third equation.

The method and apparatus for achieving vehicle-road coordination at an intersection without signal lights provided by embodiments of the present disclosure, first acquire road region width information. coordinates of obstacles and coordinates of each vehicle in a plane coordinate system, acquire a traffic action type of each vehicle, and acquire motion state parameters of each vehicle; then input the road region width information, the coordinates of the obstacles and the coordinates of each vehicle in the plane coordinate system. the traffic action type of each vehicle, and the motion state parameters of each vehicle into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle: and finally drive each vehicle to travel. on the basis of the planned trajectory information. The model for planning a vehicle traveling trajectory established based on the road region width information, the coordinates of the obstacles, the coordinates of each vehicle and the traffic action type of each vehicle may make the planned trajectory of each vehicle output by the model more accurate, so that travel trajectories between vehicles are more flexible and coordinated, thereby avoiding congestion caused by the vehicles in the intersection region, which ultimately can greatly improve the traffic efficiency at the intersection.

In some alternative implementations of the present embodiment, the apparatus for achieving vehicle-road coordination at an intersection without signal lights is applied to a vehicle-road coordination management system, and the vehicle-road coordination management system is configured to: acquire coordinates, a traffic action type and motion state parameters of each intelligent networked vehicle within a preset distance from the intersection using a sensing device and a communication device; and perform, based on the acquired coordinates, the traffic action type and the motion state parameters of each intelligent networked vehicle, the method for achieving vehicle-road coordination at an intersection without signal lights according to any one of the above, until the vehicle travels the preset distance out of the intersection.

In addition, the present disclosure further provides an embodiment of an apparatus for achieving vehicle-road coordination at an intersection without signal lights. The apparatus embodiment includes: an information unit (not shown in the figures), configured to acquire information used for trajectory planning, including: acquire road region width information, coordinates of obstacles and coordinates of each vehicle in a plane coordinate system, acquire a traffic action type of each vehicle, and acquire motion state parameters of each vehicle; where, the acquire coordinates of obstacles in a plane coordinate system includes: use a center point of a crossing in the plane coordinate system as a coordinate origin, acquire coordinates of four blocks adjacent to the crossing; each block including: the largest circle, a plurality of small circles that are inscribed with two sides of a circumscribed square of the largest circle adjacent to the origin, where sides of the circumscribed square of the largest circle are parallel to coordinate axes of the plane coordinate system, and radii of the plurality of small circles and a radius of the largest circle constitute a proportional decay sequence; a trajectory unit (not shown in the figures), configured to input the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and an action unit (not shown in the figures), configured to drive each vehicle to travel, on the basis of the planned trajectory information.

Figure 13:
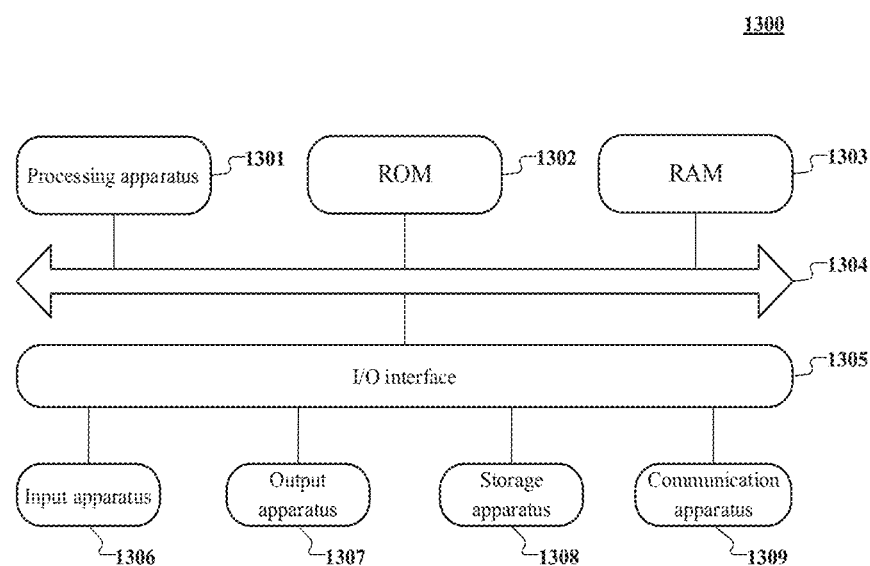
FIG. 13 is a schematic structural diagram of an electronic device suitable for implementing embodiments of the present disclosure.

Referring next to FIG. 13, illustrating a schematic structural diagram of an electronic device (for example, the server in FIG. 1) 1300 suitable for implementing embodiments of the present disclosure. The server shown in FIG. 13 is merely an example, and should not bring any limitations to the functions and usage scope of the embodiments of the present disclosure.

As shown in FIG. 13, the electronic device 1300 may include a processing apparatus (such as a central processing unit, a graphics processor) 1301, which may execute various appropriate actions and processes in accordance with a program stored in a read-only memory (ROM) 1302 or a program loaded into a random access memory (RAM) 1303 from a storage apparatus 1308. The RAM 1303 also stores various programs and data required by operations of the electronic device 1300. The processing apparatus 1301, the ROM 1302 and the RAM 1303 are connected to each other through a bus 1304. An input/output (I/O) interface 1305 is also connected to the bus 1304.

Typically, the following apparatuses may be connected to the I/O interface 1305: an input apparatus 1306 including a touch screen, a touch pad, a keyboard, a mouse, a camera, a microphone, an accelerometer, or a gyroscope; an output apparatus 1307 including such as a liquid crystal display (LCD), a speaker, or a vibrator; the storage apparatus 1308 including such as a magnetic tape, or a hard disk; and a communication apparatus 1309. The communication apparatus 1309 may allow the electronic device 1300 to perform wireless or wired communication with other devices to exchange data. Although FIG. 13 shows the electronic device 1300 having various apparatuses, it should be understood that it is not required to implement or have all the illustrated apparatuses. It may alternatively be implemented or provided with more or fewer apparatuses. Each block shown in FIG. 13 may represent one apparatus, or may represent a plurality of apparatuses as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 1309, or may be installed from the storage apparatus 1308, or may be installed from the ROM 1302. The computer program, when executed by the processing apparatus 1301, implements the above-mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the server, or a stand-alone computer readable medium not assembled into the server. The computer readable medium carries one or more programs. The one or more programs, when executed by the electronic device, cause the electronic device to: acquire information used for trajectory planning, including: acquire road region width information, coordinates of obstacles and coordinates of each vehicle in a plane coordinate system, acquire a traffic action type of each vehicle, and acquire motion state parameters of each vehicle; input the information used for trajectory planning into a model for planning a vehicle traveling trajectory to obtain planned trajectory information, where the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and drive each vehicle to travel, on the basis of the planned trajectory information.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described unit may also be provided in a processor.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

The invention claimed is:

1. A method for achieving vehicle-road coordination at an intersection without signal lights, comprising:
   acquiring information used for trajectory planning, comprising: acquiring road region width information, coordinates of obstacles and coordinates of each vehicle in a plane coordinate system, acquiring a traffic action type of each vehicle, and acquiring motion state parameters of each vehicle;
   inputting the information used for trajectory planning into a model for planning a vehicle traveling trajectory to obtain planned trajectory information, wherein the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and
   driving each vehicle to travel, on the basis of the planned trajectory information,
   wherein the acquiring coordinates of obstacles in a plane coordinate system, comprises:
   mapping an obstacle to the plane coordinate system in a form of a square, based on size information of the obstacle and position information of the obstacle on a road; and
   replacing the square with a plurality of inscribed circles of the square, wherein each inscribed circle is tangent to two sides of the square adjacent to an inner corner of the square near an origin of the plane coordinate system.

2. The method according to claim 1, wherein the traffic action type of each vehicle comprises:
one of turning-left action, going straight action, or turning-right action required for each vehicle to travel into any target lane.

3. The method according to claim 1, wherein the acquiring coordinates of each vehicle in a plane coordinate system, comprises:
mapping each vehicle to the plane coordinate system in a form of a rectangle, based on size information of each vehicle and position information of the vehicle on a road; and
replacing the rectangle with symmetrical double circumscribed circles of the rectangle, to obtain coordinates of centers and a radius of the symmetrical double circumscribed circles of the rectangle in the plane coordinate system, wherein the symmetrical double circumscribed circles are the smallest symmetrical double circumscribed circles capable of containing the rectangle.

4. The method according to claim 1, wherein the replacing the square with a plurality of inscribed circles of the square, comprises:
taking a circle, that uses a side length of the square as a diameter and a center of the square as a center, as a largest inscribed circle of the square; and
using the plurality of circles in the square that are tangent to the two sides of the square adjacent to the inner corner of the square near the origin of the plane coordinate system as a plurality of small inscribed circles of the square, wherein radii of the plurality of small inscribed circles and a radius of the largest inscribed circle constitute a proportional decay sequence.

5. The method according to claim 1, wherein the determining constraint conditions for avoiding collisions on the basis of the road region width information, the coordinates of the obstacles, and the coordinates of each vehicle in the plane coordinate system and the traffic action type, comprises:
determining a first collision avoiding constraint condition that each vehicle does not collide with the obstacles at any time t in any traffic action type based on the road region width information, the coordinates of the obstacles and the coordinates of each vehicle;
determining, based on the first collision avoiding constraint condition and the road region width information, a passable region for each vehicle in any traffic action type; and
determining, based on the coordinates of each vehicle, a second collision avoiding constraint condition in the passable region that any two vehicles in a same traffic action type do not collide and any two vehicles in different traffic action types do not collide.

6. The method according to claim 5, wherein the determining, based on the first collision avoiding constraint condition and the road region width information, a passable region for each vehicle in any traffic action type, comprises:
determining, based on the first collision avoiding constraint condition and the road region width information, in response to the traffic action type of the vehicle being a turning-left action, that the passable region for the vehicle in the turning-left action comprises an opposite road region; and/or
using, based on the first collision avoiding constraint condition and the road region width information, an intersection region in a road region in the plane coordinate system as the passable region for each vehicle to travel freely and flexibly.

7. The method according to claim 1, wherein the determining a loss function on the basis of the motion state parameters of each vehicle and the coordinates of each vehicle, comprises:
determining, based on the motion state parameters of each vehicle, a first equation for a change of the motion state parameters of each vehicle;
determining, based on the coordinates of each vehicle, a second equation for a distance between any two vehicles;
determining, based on the coordinates of each vehicle, a third equation for distances from each vehicle to an X-axis and a Y-axis of the plane coordinate system; and
determining the loss function, based on the first equation, the second equation and the third equation.

8. The method according to claim 1, wherein the method for achieving vehicle-road coordination at an intersection without signal lights is applied to a vehicle-road coordination management system, and the vehicle-road coordination management system is configured to:
acquire coordinates, a traffic action type and motion state parameters of each intelligent networked vehicle within a preset distance from the intersection using a sensing device and a communication device; and
perform, based on the acquired coordinates, the traffic action type and the motion state parameters of each intelligent networked vehicle, the method for achieving vehicle-road coordination at an intersection without signal lights according to claim 1, until the vehicle travels the preset distance out of the intersection.

9. The method according to claim 1, wherein, the acquiring coordinates of obstacles in a plane coordinate system comprises: using a center point of a crossing in the plane coordinate system as a coordinate origin, acquiring coordinates of four blocks adjacent to the crossing; each block comprising: a largest circle, a plurality of small circles that are inscribed with two sides of a circumscribed square of the largest circle adjacent to the origin, wherein sides of the circumscribed square of the largest circle are parallel to coordinate axes of the plane coordinate system, and radii of the plurality of small circles and a radius of the largest circle constitute a proportional decay sequence.

10. An apparatus for achieving vehicle-road coordination at an intersection without signal lights, comprising:
one or more processors; and
a storage apparatus, storing one or more programs thereon;
wherein the one or more programs, when executed by the one or more processors, cause the one or more processors to perform operations, comprising: acquiring road region width information, coordinates of obstacles and coordinates of each vehicle in a plane coordinate system, acquire a traffic action type of each vehicle, and acquire motion state parameters of each vehicle;
inputting the road region width information, the coordinates of the obstacles and the coordinates of each vehicle in the plane coordinate system, the traffic action type of each vehicle, and the motion state parameters of each vehicle into a model for planning a vehicle traveling trajectory to obtain planned trajectory information, wherein the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and driving each vehicle to travel, on the basis of the planned trajectory information, wherein the acquiring coordinates of obstacles in a plane coordinate system, comprises:

mapping an obstacle to the plane coordinate system in a form of a square, based on size information of the obstacle and position information of the obstacle on a road; and replacing the square with a plurality of inscribed circles of the square, wherein each inscribed circle is tangent to two sides of the square adjacent to an inner corner of the square near an origin of the plane coordinate system.

11. A non-transitory computer readable medium, storing a computer program thereon, wherein, the computer program, when executed by a processor, causes the processor to perform operations, comprising: acquiring road region width information, coordinates of obstacles and coordinates of each vehicle in a plane coordinate system, acquire a traffic action type of each vehicle, and acquire motion state parameters of each vehicle;

inputting the road region width information, the coordinates of the obstacles and the coordinates of each vehicle in the plane coordinate system, the traffic action type of each vehicle, and the motion state parameters of each vehicle into a model for planning a vehicle traveling trajectory to obtain planned trajectory information, wherein the model for planning a vehicle traveling trajectory determines constraint conditions for avoiding collisions on the basis of the road region width information, the coordinates of the obstacles, and the coordinates of each vehicle in the plane coordinate system and the traffic action type, and determines a loss function on the basis of the motion state parameters of each vehicle and the coordinates of each vehicle; and driving each vehicle to travel, on the basis of the planned trajectory information, wherein the acquiring coordinates of obstacles in a plane coordinate system, comprises:

mapping an obstacle to the plane coordinate system in a form of a square, based on size information of the obstacle and position information of the obstacle on a road; and replacing the square with a plurality of inscribed circles of the square, wherein each inscribed circle is tangent to two sides of the square adjacent to an inner corner of the square near an origin of the plane coordinate system.

12. The apparatus according to claim 10, wherein the traffic action type of each vehicle comprises:

one of turning-left action, going straight action, or turning-right action required for each vehicle to travel into any target lane.

13. The apparatus according to claim 10, wherein the acquiring coordinates of each vehicle in a plane coordinate system, comprises:

mapping each vehicle to the plane coordinate system in a form of a rectangle, based on size information of each vehicle and position information of the vehicle on a road; and replacing the rectangle with symmetrical double circumscribed circles of the rectangle, to obtain coordinates of centers and a radius of the symmetrical double circumscribed circles of the rectangle in the plane coordinate system, wherein the symmetrical double circumscribed circles are the smallest symmetrical double circumscribed circles capable of containing the rectangle.

14. The apparatus according to claim 10, wherein the replacing the square with a plurality of inscribed circles of the square, comprises:

taking a circle, that uses a side length of the square as a diameter and a center of the square as a center, as a largest inscribed circle of the square; and using the plurality of circles in the square that are tangent to the two sides of the square adjacent to the inner corner of the square near the origin of the plane coordinate system as a plurality of small inscribed circles of the square, wherein radii of the plurality of small inscribed circles and a radius of the largest inscribed circle constitute a proportional decay sequence.

15. The apparatus according to claim 10, wherein the determining constraint conditions for avoiding collisions on the basis of the road region width information, the coordinates of the obstacles, and the coordinates of each vehicle in the plane coordinate system and the traffic action type, comprises:

determining a first collision avoiding constraint condition that each vehicle does not collide with the obstacles at any time t in any traffic action type based on the road region width information, the coordinates of the obstacles and the coordinates of each vehicle;

determining, based on the first collision avoiding constraint condition and the road region width information, a passable region for each vehicle in any traffic action type; and determining, based on the coordinates of each vehicle, a second collision avoiding constraint condition in the passable region that any two vehicles in a same traffic action type do not collide and any two vehicles in different traffic action types do not collide.

16. The apparatus according to claim 15, wherein the determining, based on the first collision avoiding constraint condition and the road region width information, a passable region for each vehicle in any traffic action type, comprises:

determining, based on the first collision avoiding constraint condition and the road region width information, in response to the traffic action type of the vehicle being a turning-left action, that the passable region for the vehicle in the turning-left action comprises an opposite road region; and/or using, based on the first collision avoiding constraint condition and the road region width information, an intersection region in a road region in the plane coordinate system as the passable region for each vehicle to travel freely and flexibly.

17. The apparatus according to claim 10, wherein the determining a loss function on the basis of the motion state parameters of each vehicle and the coordinates of each vehicle, comprises:

determining, based on the motion state parameters of each vehicle, a first equation for a change of the motion state parameters of each vehicle;

determining, based on the coordinates of each vehicle, a second equation for a distance between any two vehicles;

determining, based on the coordinates of each vehicle, a third equation for distances from each vehicle to an X-axis and a Y-axis of the plane coordinate system; and determining the loss function, based on the first equation, the second equation and the third equation.

18. The apparatus according to claim 10, wherein the apparatus for achieving vehicle-road coordination at an intersection without signal lights is applied to a vehicle-road coordination management system, and the vehicle-road coordination management system is configured to:

acquire coordinates, a traffic action type and motion state parameters of each intelligent networked vehicle within a preset distance from the intersection using a sensing device and a communication device; and perform, based on the acquired coordinates, the traffic action type and the motion state parameters of each intelligent networked vehicle, the method for achieving vehicle-road coordination at an intersection without signal lights according to claim 1, until the vehicle travels the preset distance out of the intersection.

* * * * *